June 2, 1970  E. J. WARD ET AL  3,515,206
COOLING SYSTEMS
Filed Sept. 6, 1968
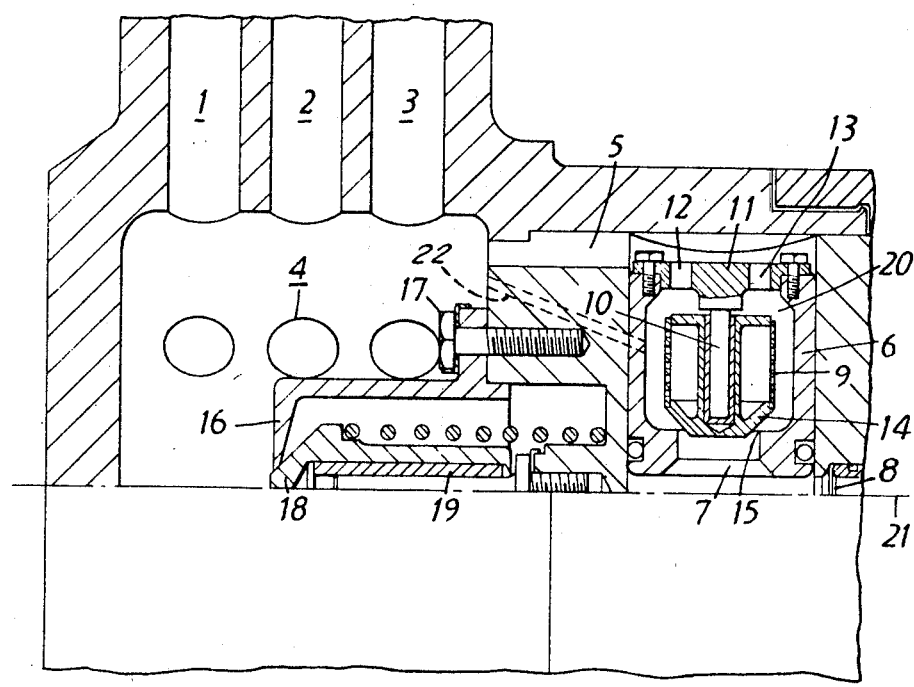
INVENTORS
EDWARD J. WARD
PETER R. HALL
By Shoemaker and Mattare
ATTYS.

United States Patent Office 3,515,206
Patented June 2, 1970

3,515,206
COOLING SYSTEMS
Edward J. Ward and Peter R. Hall, Haywards Heath, Sussex, England, assignors to The Gas Council, London, England, a corporation of Great Britain
Filed Sept. 6, 1968, Ser. No. 758,051
Claims priority, application Great Britain, Sept. 8, 1967, 41,123/67
Int. Cl. G05d 23/00
U.S. Cl. 165—32                      7 Claims

ABSTRACT OF THE DISCLOSURE

Certain liquid-cooled rotating machines rely on the maintenance of an annular ring of coolant, the internal radius of which is below a predetermined value. The invention provides a valve for maintaining this predetermined value, said valve including a buoyant member which is urged in the direction necessary to close the valve by the head of coolant in the annulus. The system is designed so that the various forces acting on the buoyant member serve to open the valve when the coolant internal radius exceeds a predetermined value and to close the valve when it is below said predetermined value.

---

This invention relates to cooling systems for rotating parts of machines which are operated in circumstances in which heat is absorbed by said rotating parts and it is an object of the invention to provide means for controlling the supply of cooling liquid to said rotating parts.

Fans or pumps designed to transport hot gases may be provided with cooling systems in which the heat is removed primarily by the evaporation of a liquid. In such a system, it is necessary to provide for the replacement of the evaporated liquid coolant and a control system is required to maintain the quantity of liquid in the cooling system between pre-determined limits. It is a further object of the present invention to provide a control system which is particularly advantageous for use in a cooling system of the kind referred to.

The invention consists in a cooling system for rotating parts of a machine, including a chamber communicating with passages for cooling liquid in said rotating parts and a valve means connected between said chamber and a supply of said cooling liquid, wherein said valve means include a buoyant member arranged so that a closing force is applied to the valve means by liquid pressure due to centrifugal force acting on the liquid in the chamber, said liquid pressure being dependent on the quantity of liquid in the chamber.

It is to be understood that the liquid pressure acting on the buoyant member will depend on the speed of rotation of the chamber as well as on the quantity of liquid in the chamber. As the speed of rotation is increased, the liquid pressure will also increase so that the closing force applied to the valve means becomes greater. Preferably the valve means rotate with the rotating parts and are arranged so that centrifugal force acts on the valve means in the direction to open the valve. In this case the system may be designed so that variations in the liquid pressure acting on the buoyant member due to variations in the speed of rotation of said rotating parts are substantially balanced by variatious in the centrifugal force acting on the valve means due to said speed changes.

In the simplest form of the invention, the valve means include a float having a valve head integral therewith, said valve means being in the form of a poppet valve. The float may be mounted for sliding movement on a spindle, the axis of which may be radial. However, if the centrifugal force in this case produces too large an opening force on the valve, the axis of the spindle may be inclined to the radial plane.

The valve may be biased by means of a spring in either direction depending on the limits required and the relative forces tending to open and close the valve. However, it will be understood that, if the design is such that the forces tending to open the valve exceed the forces tending to close the valve so that a spring has to be provided biasing the valve in the direction of closure, the arrangement can be made to fail safe and the required quantity of liquid coolant can be provided in the cooling system when the machinery is stationary.

When the liquid in the cooling system is heated to such an extent that vapour is produced, the vapour pressure of the evaporated liquid will produce an additional force tending to close the valve. In some circumstances, the vapour pressure in the chamber may also increase the liquid pressure acting on the buoyant member and, to reduce this effect as far as possible, a bleed passage may be provided, if necessary, to equalise the vapour pressure in the chamber and in the valve means. Moreover, the increase in pressure due to the vapour pressure as the liquid is converted to vapour may be arranged to be less than the decrease in pressure due to the reduction in the mass of the liquid on which the centrifugal force is acting.

With certain types of valve, the pressure of the supply of cooling liquid will act on the valve in a direction tending to open the valve and thus forces acting on the valve may be summarised as follows:

(A) Forces tending to close the valve:
   (1) Pressure produced by centrifugal force acting on the mass of liquid.
   (2) Vapour pressure of evaporated liquid.
(B) Forces tending to open the valve:
   (1) Centrifugal force acting on the valve.
   (2) Pressure of the liquid supply.
   (3) Pressure produced by centrifugal force acting on the mass of liquid upstream of the valve.

The system may be designed so that the valve opens when the quantity of liquid falls below a pre-determined minimum value and closes when the quantity of liquid exceeds a pre-determined maximum value.

One method of performing the invention will now be described with reference to the accompanying diagrammatic drawing which is a sectional view of a portion of a fan intended to transport hot gases and incorporating a cooling system in accordance with the invention.

The fan illustrated includes a plurality of blades provided with cooling passages such as those illustrated at 1, 2 and 3. All these cooling passages communicate with a central chamber 4 in the hub of the fan. The chamber 4 is in communication through a passage 5 with the output side of a control valve which is generally indicated by the reference numeral 6. The inlet side 7 of this control valve is in communication with a central tube 8 which leads to a supply of coolant liquid.

The control valve 6 includes a float 9 which is slidable on a radial spindle 10 mounted on a valve cap 11 provided with a number of outlet ports such as those illustrated at 12 and 13. The float is made of a hard metal and is welded to ensure that it is air-tight at all temperatures to which it will be subjected. A bearing sleeve is provided to ensure that the float moves easily along the spindle 10. The float includes a valve head 14 which engages with a seat 15.

The chamber 4 is provided with a relief valve generally indicated at 16 and secured to the fan hub by bolts such as that shown at 17. The relief valve includes a spring-loaded valve member 18 axially slidable on a bearing sleeve 19.

When the fan is rotating, centrifugal force acts on the coolant causing it to enter the cooling passages in the fan blades and to form an annulus in the chamber 4. Centrifugal force also causes the coolant in the hollow interior 20 of the valve 6 to occupy the radially outward part of this space and to form a radially inwardly facing surface. Since coolant can flow in either direction along the passage 5 which is parallel to the axis of rotation 21 of the fan, the radial distance between the axis and the surface of the coolant in the space 20 will be the same as the radial distance between the axis 21 and the surface of the coolant in the chamber 4. The pressure of the liquid in the chamber 20 will act on the float 9 tending to move it radially inwards. Additional forces acting on the float 9 at this stage are centrifugal force acting on the mass of the float and tending to move the float radially outwards and the pressure of the coolant supply in the passage 8 also tending to move the float radially outwards. Further, in the arrangement shown, centrifugal force will act on the mass of the coolant in the inlet passage 7 of the valve and will also tend to move the float radially outwards. The system is designed so that the resultant of these forces tends to open the valve until a predeterminted quantity of liquid is contained in the chamber 4 and to close the valve when the chamber 4 contains more than the predetermined quantity.

As the fan becomes heated, the temperature of the coolant rises until vapour is produced in the chamber 4. Thus there will be vapour pressure in the chamber 4 and this will increase until it is sufficient to open the relief valve 16. In the system, as illustrated, this vapour pressure would tend to force liquid along the passage 5 to reduce the radial distance between the axis 21 and the surface of the liquid in the space 20. Accordingly, the liquid pressure acting on the float 9 would be increased and the valve would be maintained closed even after the quantity of liquid in the chamber 4 had dropped below the predetermined value. Accordingly, a bleed passage 22 is provided between the chamber 4 and the space 20 so that the vapour pressure in the space 20 is equalized with that in the chamber 4. As a result the radial positions of the surfaces of the liquid in the chamber 4 and in the space 20 will be substantially equal. The vapour pressure in the chamber 20 will still act on the float 9 to tend to move it radially inwards, but the resulting force will be considerably less than that which would be produced by the liquid pressure if no bleed passage were provided. Moreover, the force on the float due to the vapour pressure will be less than the decrease in the liquid pressure acting on the float as a result of the evaporation of a portion of the liquid.

We claim:

1. A cooling system for rotating parts of a machine, including a chamber in said rotating parts communicating with passages for cooling liquid in said rotating parts and valve means connected between said chamber and a supply of said cooling liquid, wherein said valve means include a buoyant member arranged so that a closing force is applied to the valve means by liquid level in the chamber, said liquid level exerting a closing pressure on said valve means dependent on the quantity of liquid in the chamber.

2. A system as claimed in claim 1, wherein the valve means rotate with said rotating parts and are arranged so that centrifugal force acts on the valve means in the direction to open the valve.

3. A system as claimed in claim 2, wherein the buoyancy of the buoyant member is so related to its weight that variations in the liquid pressure acting on the buoyant member due to changes in the speed of rotation of said parts are substantially balanced by variations in the centrifugal force acting on the valve means due to said speed changes.

4. A system as claimed in claim 1, wherein said valve means include a float having a valve head integral therewith.

5. A system as claimed in claim 4, wherein said float is mounted for sliding movement on a spindle, the axis of which is perpendicular to the axis of rotation of the rotating parts.

6. A system as claimed in claim 1, including a bleed passage interconnecting said chamber and said valve means to equalise the vapour pressures in said chamber and in said valve means.

7. A system as claimed in claim 1, wherein the output side of said valve means is in communication with said chamber through a passage, the axis of which is substantially parallel to the axis of rotation of said rotating parts.

References Cited

UNITED STATES PATENTS 2,883,151   8/1959   Dolida _____ 253—39.15

ROBERT A. O'LEARY, Primary Examiner

C. SUKALO, Assistant Examiner

U.S. Cl. X.R.

165—47; 253—39.15